Oct. 24, 1950  W. M. MANSFIELD  2,526,823
RUG DISPLAY DEVICE

Filed Dec. 26, 1946  7 Sheets-Sheet 1

INVENTOR.
Warren M. Mansfield
BY
ATTORNEY

Oct. 24, 1950  W. M. MANSFIELD  2,526,823
RUG DISPLAY DEVICE
Filed Dec. 26, 1946  7 Sheets-Sheet 2
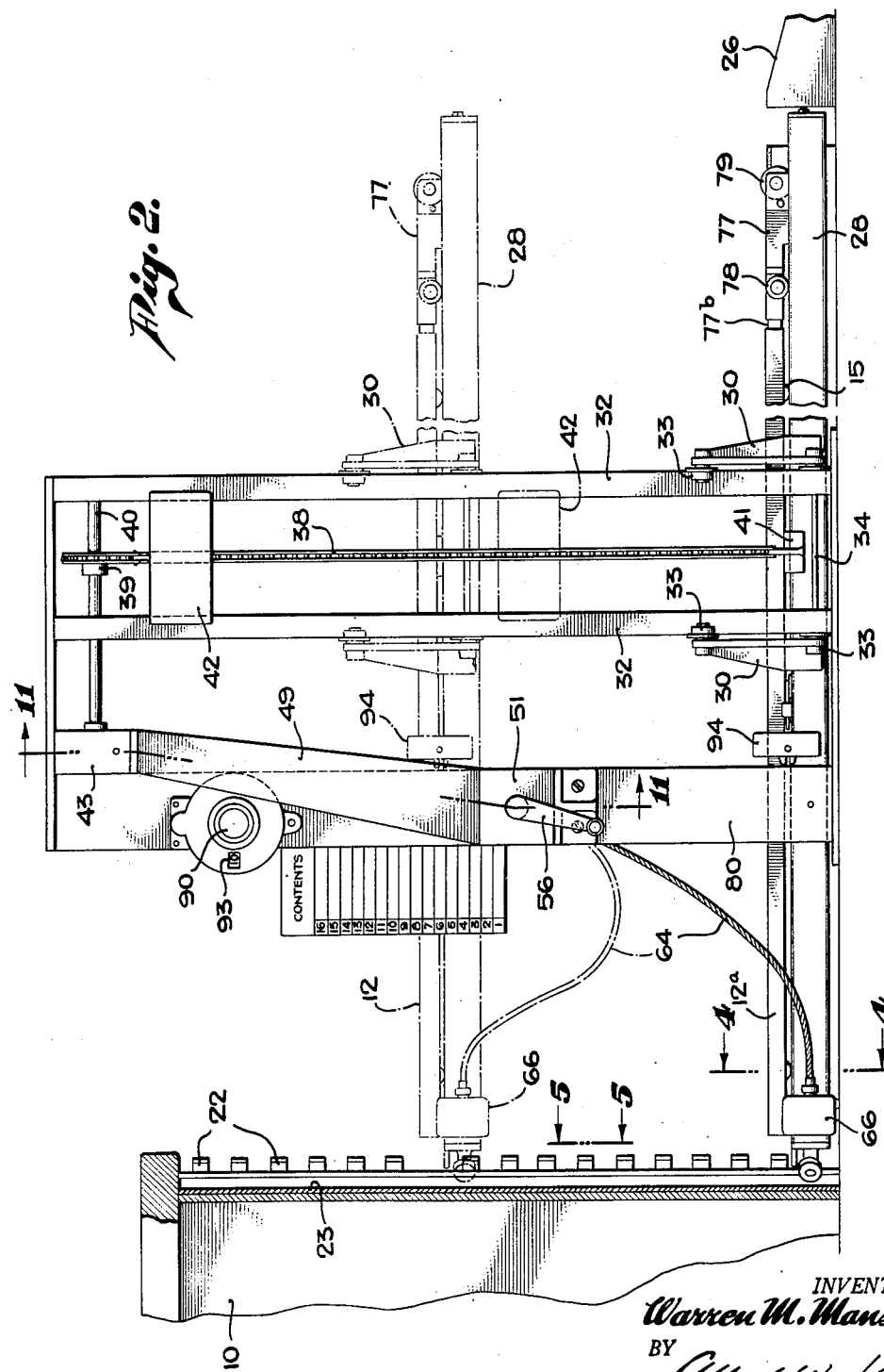
INVENTOR.
Warren M. Mansfield
BY
ATTORNEY

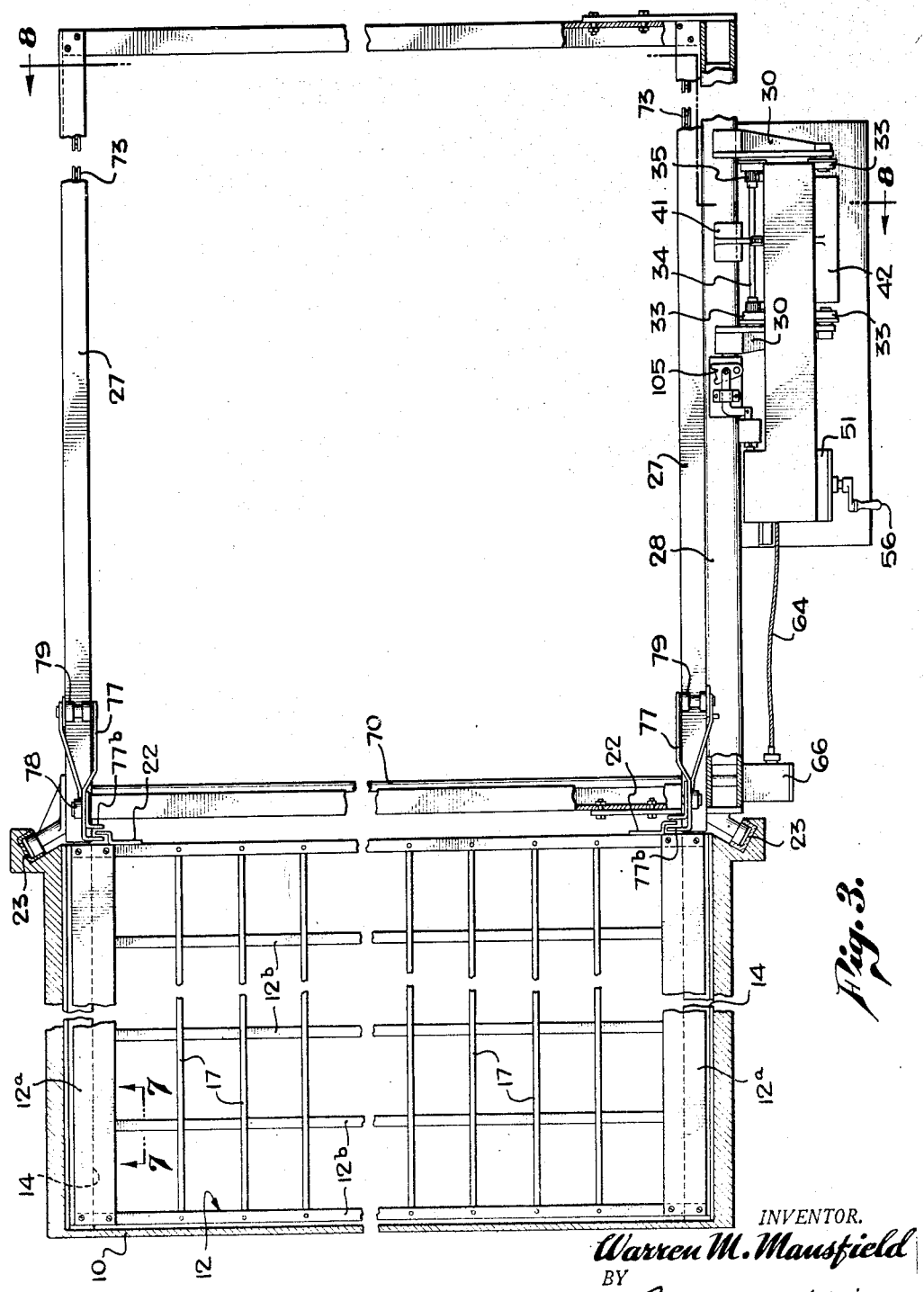

Oct. 24, 1950  W. M. MANSFIELD  2,526,823
RUG DISPLAY DEVICE
Filed Dec. 26, 1946  7 Sheets-Sheet 4
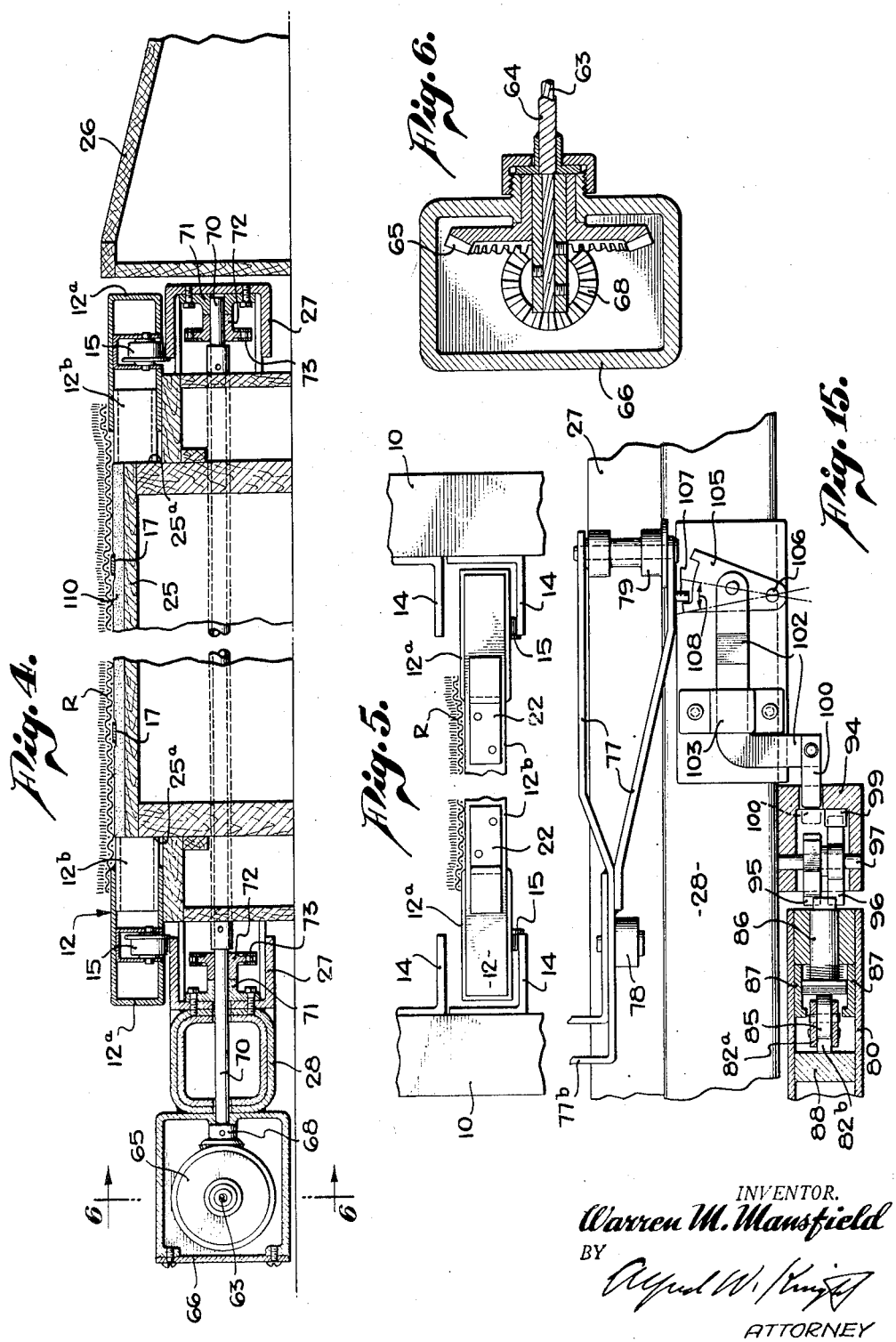
INVENTOR.
Warren M. Mansfield
BY
Alfred W. Knight
ATTORNEY

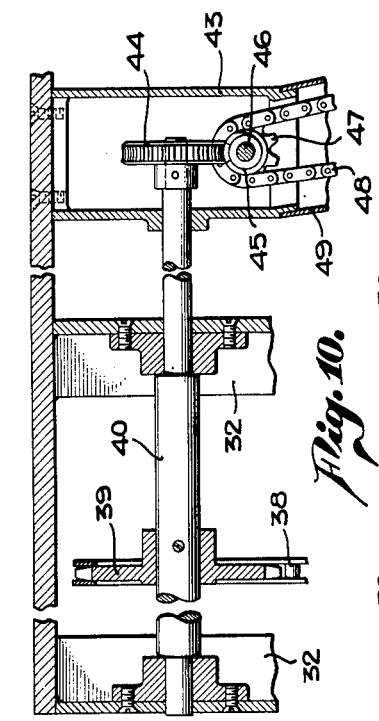
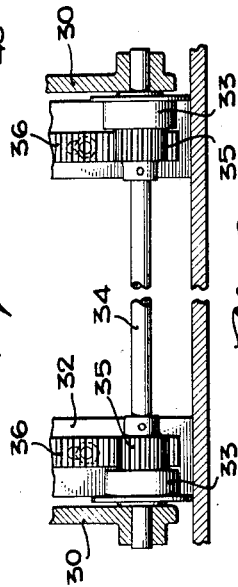
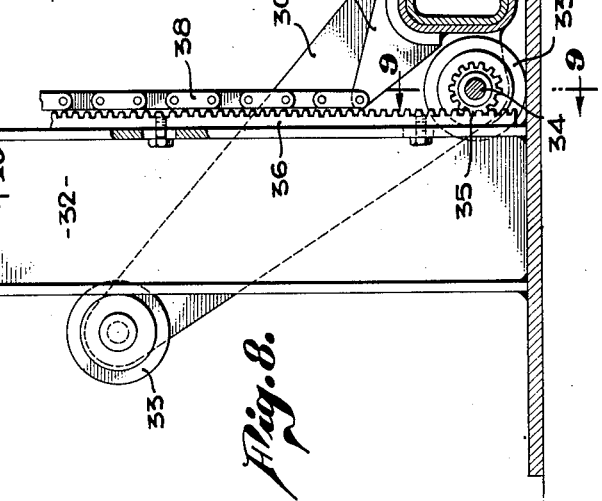
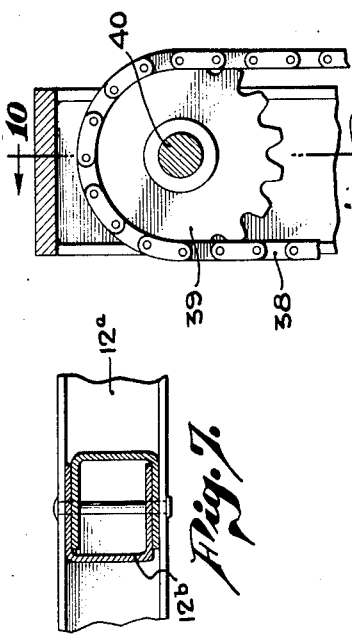

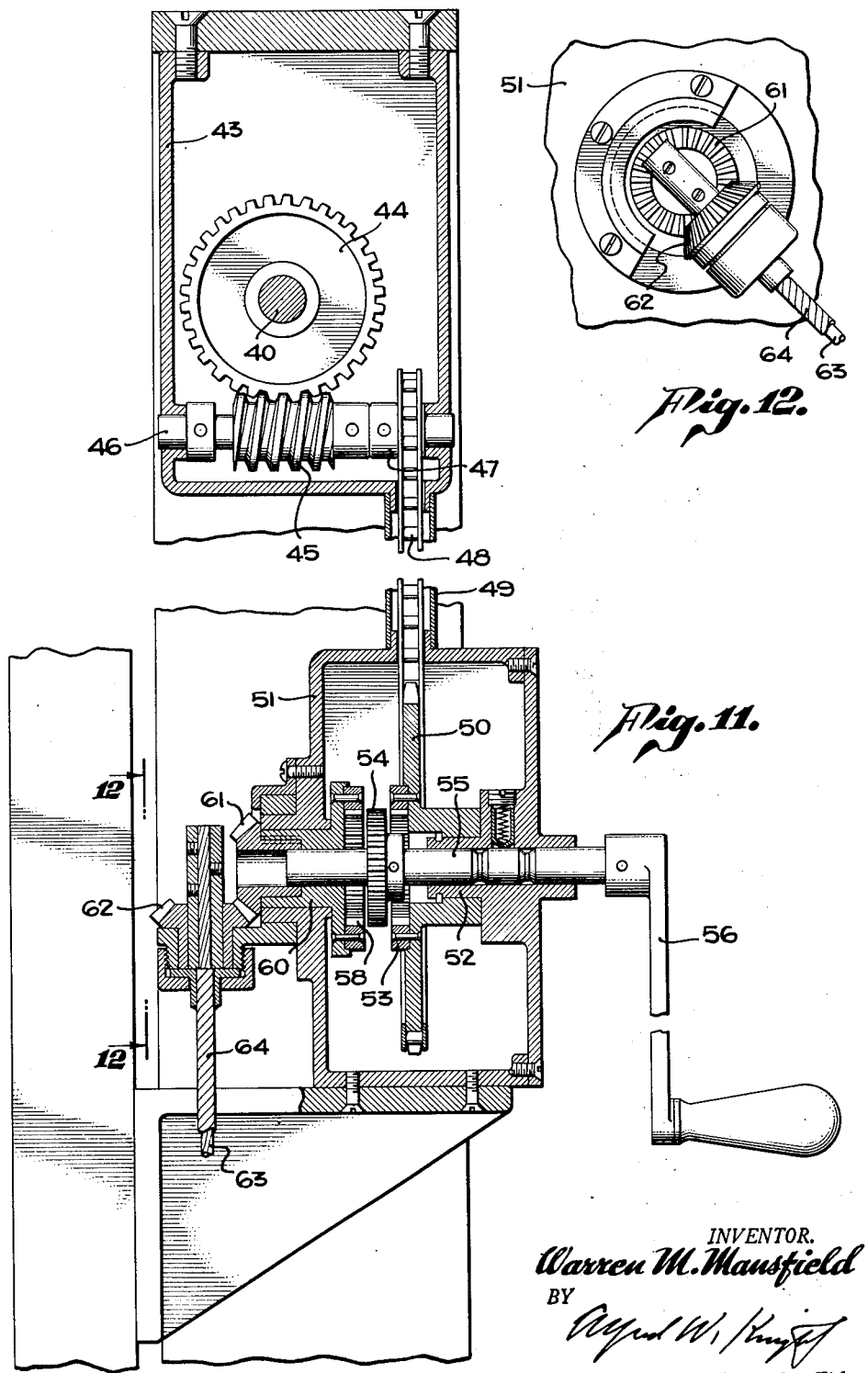

Oct. 24, 1950 — W. M. MANSFIELD — 2,526,823
RUG DISPLAY DEVICE
Filed Dec. 26, 1946 — 7 Sheets-Sheet 7

INVENTOR.
Warren M. Mansfield
BY
ATTORNEY

Patented Oct. 24, 1950

2,526,823

UNITED STATES PATENT OFFICE 2,526,823

RUG DISPLAY DEVICE

Warren M. Mansfield, Glendale, Calif., assignor to Thomas L. Linthicum, Los Angeles, Calif.

Application December 26, 1946, Serial No. 718,395

11 Claims. (Cl. 40—36)

The present invention relates generally to display racks and devices for large flat objects, and more especially to apparatus for storing and displaying rugs or similar merchandise.

Although it would be ideal to do so, rugs cannot normally be displayed with a large number of them laid flat on the floor, which is their normal position, because of the enormous floor space required for this type of display. It has been, and still is, the usual practice to keep the rugs in piles and to turn them back, one by one, to display them without removing them from the stack. This is a laborious and time-consuming task, particularly when it is desired to view a rug which is near the bottom of the pile; the work involved usually detracts considerably from the effectiveness of the saleman's presentation; and the prospective purchaser sees only a small portion of many of the rugs, especially near the bottom of the pile.

Various mechanical devices have been provided to aid in rug display and have solved the problem to some extent, but all have shortcomings. Some devices have been provided for displaying rugs suspended in a vertical position, but this is an unnatural position and does not present to the prospective purchaser the general appearance which he desires. Purchaser wants to see the rug on the floor, as this is the normal position when in use. Recognizing this desire, there have been provided devices for displaying rugs laid horizontally; but, in general, these devices have been complicated or cumbersome in operation. Never have known devices been able to remove a rug from a stack of rugs and place the selected rug on the floor in a position to present to the prospective purchaser the most favorable appearance, and in a position where the purchaser may, if he desires, walk on the rug to ascertain the appearance and feel of the rug when in use.

Hence it is a general object of my invention to provide a device for displaying rugs, or other similar large flat objects, in the normal position of use on the floor where the prospective purchaser may view the rug in a horizontal position and may walk on it.

It is also an object of my invention to provide a rug display device in which a number of rugs can be stored in a horizontal position, and may be enclosed to some extent to keep them from dust and dirt, but at all times ready for display.

It is an object of the invention to provide a display device in which any rug may be selected and displayed without delay and without disturbing the other rugs.

A further object is to provide a device which will permit the display of two rugs simultaneously in order that a purchaser may compare one with the other.

Another object is to provide a rug display device which is simple in construction and operation and consequently free of problems of cost, installation, and maintenance, and which can be easily operated in order to allow the salesman to devote the maximum of time and attention to the purchaser.

The above and other advantages of my invention are attained by providing a rug display device which comprises three principal parts. The first is a storage cabinet containing a plurality of rugs, the second is a display platform at or near floor level adjacent to one side of the storage cabinet, and the third is a tray handling mechanism which moves rugs from the storage cabinet to the display platform and return.

The storage cabinet is composed of a plurality of trays arranged in vertical stack, each tray carrying a rug in a horizontal position. The cabinet is preferably enclosed to some extent in order to shut out dust and dirt, and may have one or more sides open or provided with removable panels in order to provide access to the stack of trays and permit withdrawal of any selected tray and rug carried thereon. In order to cooperate fully with the rug display platform, the trays are of novel design and comprise a frame, ordinarily rectangular, of any conventional structural shape which will resist bending to give sufficient rigidity to the frame, and a reticulate portion within the frame. This portion supports the rug and preferably includes members of relatively small vertical dimension, typically thin flat aluminum straps, extending between opposite sides of the rectangular frame to help support the rug carried by the tray.

The display platform is separate from the storage cabinet and is located adjacent an open side of the cabinet. The platform may rest upon the floor, or it may be recessed in the floor so that the top of the platform is substantially at the level of the surrounding floor. The display platform is itself recessed to receive and support a tray with the rug thereon in such a manner that, because of the reticulate nature of the tray, the rug rests directly upon and is supported by the upper surface of the platform. This arrangement permits a prospective purchaser to walk upon the rug, the weight of the person being carried by the platform rather than by the tray.

By providing duplicate tray handling mechanisms and platforms one at each of opposite sides of the storage cabinet, two rugs may be displayed simultaneously. Thus two purchasers may be served at the same time, or one purchaser may compare two rugs.

In order to remove the trays from the storage cabinet and place them upon the platform, and to return them to the storage cabinet when through with the display, there is provided a tray handling mechanism which generally comprises an elevator, an upright column located adjacent to the display platform, means for supporting the elevator from the upright column, and driving means for raising and lowering the elevator on the column. The elevator consists of an open frame of a size and shape sufficient to receive and support the rug-carrying tray, the elevator being open in its central portion in order that no part of the elevator intervenes between load bearing parts of the platform and the tray when the tray is set down upon the platform. The elevator supporting column is also preferably accompanied by registration means which will insure that the elevator is raised or lowered to the proper point to bring it into registration with the selected tray.

The elevator carries tray moving means, which is engageable with any selected tray by vertical movement of the elevator. The tray moving means comprises a pair of tray engaging members, and means for simultaneously moving the tray engaging members horizontally in order to withdraw a tray from the stack and move it onto the elevator. Reverse horizontal movement of the tray engaging members returns the tray to its position in the stack from the elevator.

Since the elevator and the tray moving means are each in operation only when the other is stationary, I preferably provide a common driving means for these two elements so that the whole mechanism may be controlled from a single drive shaft. In my preferred embodiment, I provide a gear driven by the single shaft and movable to two driving positions, in one of which positions the drive gear engages drive linkage which actuates the elevator and in the other of which positions the drive gear engages a second driving linkage which actuates the tray moving means.

How the above objects and advantages of my invention, as well as others not specifically mentioned, are attained will be better understood by reference to the following description and to the annexed drawings, in which:

Fig. 2 is a side elevation of the elevator assembly with the elevator lowered to the display platform in display position, only a front corner of the storage cabinet being shown;

Fig. 3 is a plan view of the rug display machine with the top removed from the storage cabinet to show a tray and central portions of the apparatus broken away in order to contract the figure;

Fig. 4 is an enlarged transverse vertical section through the display platform and elevator, on line 4—4 in Fig. 2;

Fig. 5 is a fragmentary front elevation of the storage cabinet showing only a single tray in position in the cabinet;

Fig. 6 is an enlarged vertical section through the gear housing on the side of the elevator on line 6—6 in Fig. 4;

Fig. 7 is a fragmentary section on line 7—7 of Fig. 3 showing construction of the tray;

Fig. 8 is an enlarged vertical section through the elevator, the platform, and the elevator column, on line 8—8 in Fig. 3, with intermediate portions broken away;

Fig. 9 is a fragmentary section and elevation on line 9—9 of Fig. 8;

Fig. 10 is a fragmentary vertical section on line 10—10 of Fig. 8;

Fig. 11 is an enlarged fragmentary vertical section on line 11—11 of Fig. 2 showing the common drive means for both the elevator and the tray moving means;

Fig. 12 is a fragmentary elevation on line 12—12 of Fig. 11;

Fig. 15 is a fragmentary plan and horizontal section on line 15—15 of Fig. 13.

Figure 1:
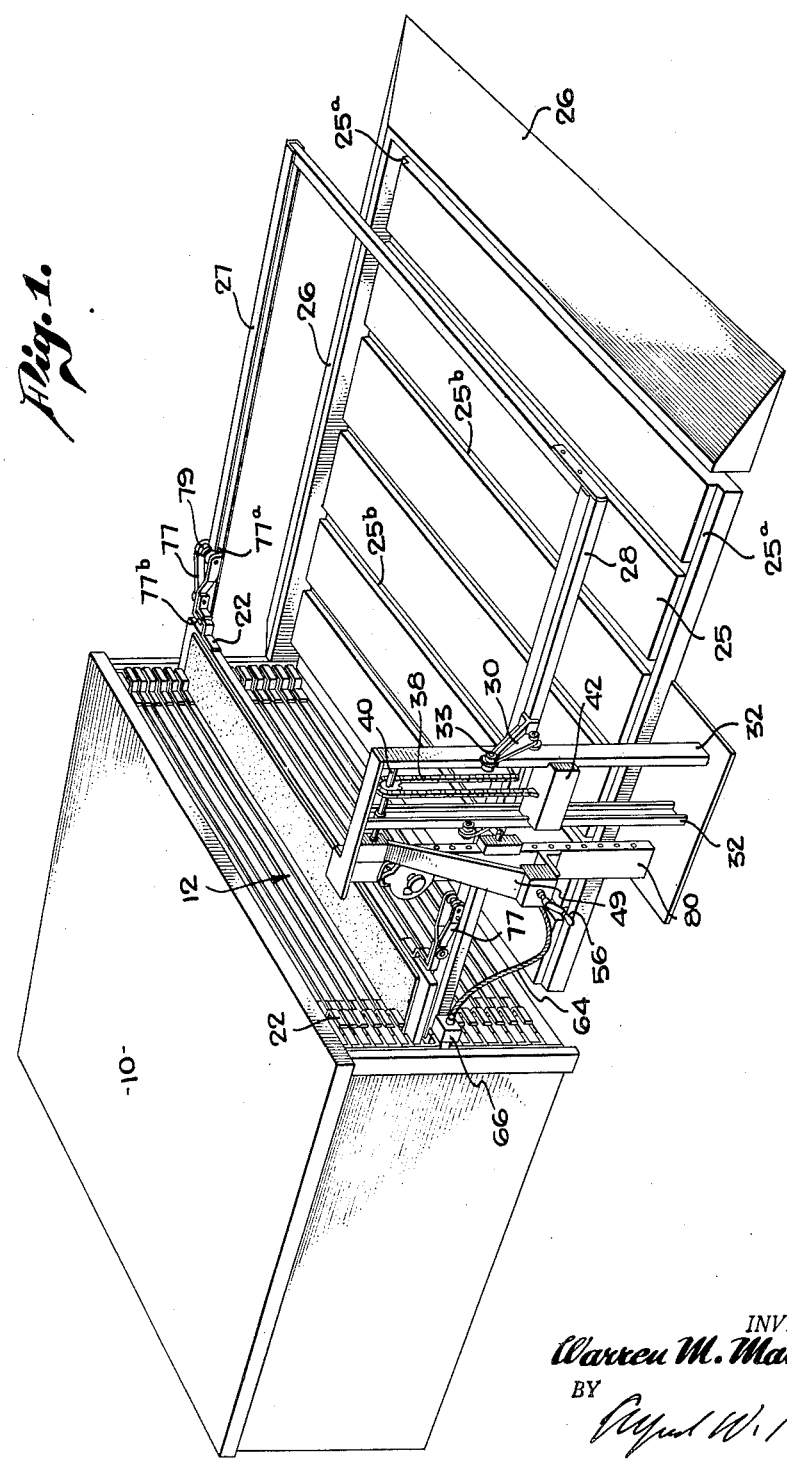
Fig. 1 is a perspective view of a rug display machine constructed according to my invention.

Referring now to Fig. 1, the storage cabinet containing the rug-carrying trays is shown at 10. The cabinet is preferably enclosed at the top and some sides in order to protect the rugs from accumulation of dust. In the figure, one side is shown open, but this may be closed by a removable panel, not shown, when the apparatus is not in use. Within this cabinet, a plurality of rug-carrying trays 12 are arranged in a vertically extending stack, the individual trays extending horizontally and being adapted to support a rug lying flat in a horizontal position. As shown in Figs. 3 and 5, at opposite walls of cabinet 10 are vertically extending rows of horizontally extending angles 14 which are combined supports and guides for the rug-carrying trays 12. The vertical spacing between two successive angles 14 need only be great enough to permit a tray and the rug R on it to pass between the two angles.

The construction of a tray 12 can best be understood by reference to Figs. 3 and 4. In general, each tray 12 comprises an open rectangular frame, made of any suitable hollow structural shapes which will provide suitable strength and rigidity, and a reticulate portion within the frame. In the embodiment shown, tray 12 comprises two end members 12a which are connected together by a plurality of parallel members 12b. The outermost member 12b at each side cooperates with end members 12a to form the frame rectangle. End members 12a are shown as being made of deep channel sections while members 12b are square tubing or two channels with their legs lying side-by-side as shown in Fig. 7, to form a box. The end members 12a are deep enough horizontally to carry rollers 15 which support the tray on angle guides 14. Rollers 15 are preferably flanged, as shown in Fig. 5 and so spaced that the inner edges of angles 14 engage these flanges to guide trays 12 as they move in and out of cabinet 10.

The rug supporting central section of each tray 12 may be made in other suitable ways, but I prefer to form a network of members by crossing the members 12b with a plurality of relatively thin flat straps 17. Straps 17 preferably lie on the inner frame members 12b and are fastened only at their ends to the two outside members 12b.

In general, the over-all shape of tray 12 corresponds with and is determined by the shape and size of the rug being displayed thereon, and the dimensions of the tray are substantially the same, or preferably slightly larger, than the dimensions of the rug. Thus the rug lies on and is supported almost entirely by the central portion of the tray. It is desired that the members composing this central portion of the tray cooperate with the rug display platform in such a way that the rug can be supported by the platform and not by the tray. For this reason, the tray members either are fitted into recesses in the platform, or have a relatively small vertical dimension in order that the rug over the thin members lies flat upon the display platform, as will be later discussed. Other constructions may be used for the rug support, but the reticulate construction shown has the advantage of providing adequate strength with a minimum of weight. It will be obvious that thin sheet material, such as metal or fabric, may also be used. In the construction shown, I prefer to use metal straps 17 having a thickness of .020 inch; and by the phrase "relatively small vertical dimension" I refer to a dimension which is, in general, less than about .050 inch. Straps thicker than this are apt to become objectionably bulky.

As will be seen in Figs. 3 and 5, two double angle brackets 22 are attached to the front edge of each tray 12. These brackets are provided in order that the tray engaging means, to be described later, can engage a selected tray to withdraw it from the stack.

At this point it is desired to mention one other feature of storage cabinet 10. At each of the two front corners there is a vertically extending guide 23, in the shape of a channel. The two guides 23 are placed at an angle with respect to cabinet 10, that is the open sides of the guides face forwardly and inwardly in order to guide the elevator in a vertical path and prevent undesirable horizontal motion of the elevator, as will be more fully described.

Adjacent the open side of cabinet 10 is display platform 25 upon which it is desired to place the rugs for display purposes. In this description I have shown platform 25 as resting upon the floor, and being bordered on two sides by a ramp 26; but from the following description it will be evident that platform 25 may be sunk into the floor, or may be built as a part thereof, in which case ramp 26 may be dispensed with.

I shall now describe the tray handling means which is provided for withdrawing a selected tray from the stack of trays within cabinet 10 and placing it upon platform 25. This means includes elevator 27 which is constructed in the shape of an open rectangle, as may be seen in Figs. 1 and 3. Elevator 27 is framed of channel shaped members, and is reinforced along one side by a length of square tubing 28 which extends for the full length of the elevator. At this one side, elevator 27 is supported by a pair of spaced arms 30 which are attached to tubing 28 at their lower ends.

At one side of display platform 25 is a column composed of two parallel, upright channels 32 which are spaced apart horizontally and comprise a part of the means for raising and lowering elevator 27 over platform 25. Each arm 30 is provided with a pair of rollers 33, as seen best in Figs. 2 and 8, which engage opposite sides of one of the uprights 32, thus supporting arms 30 and elevator 27 on the column for vertical movement of the elevator. The lower roller 33 on each arm 30 is fastened to shaft 34, as shown in Fig. 9, the ends of the shaft being journaled in arms 30. There is also attached to shaft 34 two pinions 35, each of which meshes with a rack 36 attached to the face of a channel 32 toward elevator 27. The interconnection of these two rack-and-pinion arrangements by shaft 34 serves to keep the two arms 30 in horizontal alignment and tube 28 and elevator 27 in the desired horizontal position so that arms 30 move freely up and down the upright column formed by channels 32.

Elevator 27 is raised and lowered by means of chain 38 which passes over the top of sprocket 39 fastened to shaft 40 journaled in bearings at the upper ends of uprights 32. One end of chain 38 is fastened to bracket 41 on tubing 28, while the other end is fastened to counterweight 42. One end of shaft 40 projects beyond channel 32, as may be seen in Figs. 2 and 10, and at that end of the shaft there is attached gear 44. As shown in Figs. 10 and 11, gear 44 meshes with worm 45 which is pinned to shaft 46 journaled in the sides of housing 43. Also secured to shaft 46, is sprocket 47 driven by chain 48 that extends downwardly within housing 49 and passes over drive sprocket 50 located within gear casing 51.

Referring to Fig. 11, it will be seen that drive sprocket 50 rotates about a bearing formed at 52 by a boss on the cover plate of housing 51. On one side of drive sprocket 50 is attached an internal ring gear 53 adapted to mesh with sprocket 54 which is secured to shaft 55. Shaft 55 is journaled in the bearing at 52 concentrically with gear 50, and is adapted to horizontal axial movement within the bearing. In the position shown in Fig. 11, gear 54 is in a neutral or non-driving position; but when shaft 55 is moved to the right, gear 54 meshes with internal gear 53 and drive sprocket 50 is rotated when shaft 55 is turned by means of crank 56. Thus drive shaft 55 is movable to a driving position in which, when crank 55 is turned, power is transmitted through the drive linkage just described to drive sprocket 39 and raise or lower chain 38 and elevator 27.

I have shown drive shaft 55 as being adapted to manual operation by means of crank 56. However, my invention is in no way necessarily limited either to manual operation or to the particular elevator operating means shown; and it is within the scope of my invention to provide an electric motor or other suitable source of power to rotate drive shaft 55, or to provide other mechanism for raising and lowering the elevator.

Shaft 55 may be moved to the left from the position of Fig. 11 to reach a second driving position in which gear 54 meshes with a second concentric internal ring gear 58 which is attached to hub 60 rotatably mounted in the back wall of gear housing 51. Rotation of hub 60 turns the two meshing bevel gears 61 and 62, and gear 62 in turn drives flexible shaft 63 inside stationary housing 64.

The other end of flexible shaft 63 is attached to bevel gear 65 within housing 66 mounted on elevator 27 adjacent storage cabinet 10, as shown particularly in Figs. 4 and 6. Bevel gear 65 meshes with and drives a second bevel gear 68 attached to one end of shaft 70.

Shaft 70 extends entirely across elevator 27 and is journaled in bearings 71 attached to the inner faces of the frame members of the elevator. At each end of the shaft adjacent bearings 71, is a sprocket 72 attached to, and driven by, shaft 70. Extending lengthwise of elevator 27 in a direction perpendicular to shaft 70, are two endless chains 73. One of these chains passes over each sprocket 72, as shown in Fig. 4, while at the other end of the elevator the chains pass over two similar idler sprockets 74 rotatably mounted on short shafts carried in bearings 75 attached to the inner faces of the channel frame members, as shown in Fig. 8.

Chains 73 are for the purpose of moving across elevator 27 the tray engaging and moving means carried by the elevator at each of opposite sides. At each side, this means comprises an irregularly shaped bifurcated frame 77 which, as may be seen best in Figs. 3 and 15, is supported on the elevator by two rollers 78 and 79 which roll over the top surface of the elevator. Rollers 79 are preferably flanged at least on their outer ends to engage the sides of the elevator frame in order to guide members 77 along the elevator and to keep them in proper alignment. Adjacent roller 79, each frame 77 has a downwardly extending arm 77a (see Fig. 8) which is attached to an endless chain 73 so that motion of the two chains 73 draws both members 77 in unison along the elevator.

At their forward ends toward trays 12, each frame 77 has a hook-shaped portion 77b which, by vertical movement, can be engaged with a bracket 22 on the forward side of any selected tray 12. As elevator 27 moves up and down, with the tray engaging means 77 in the position shown in Fig. 3, the hook portions 77b move up and down the stack of trays past successive brackets 22. When in registration with the selected tray, movement of members 77 over the surface of elevator 27 engages the selected tray and moves it onto the elevator, and subsequently back off of the elevator, by movement of members 77 toward the right or left respectively as viewed in Fig. 3.

Tray engaging members 77 are moved across elevator 27 by turning crank 56 which rotates drive shaft 55. Power from shaft 55 is transmitted to members 77 through the mechanical linkage already described. The advantage of flexible shaft 63 as a portion of this linkage between the tray moving members and drive shaft 55 is now evident, as it permits transmission of power regardless of the elevator position.

As previously mentioned, it is within the scope of my invention to provide for other than manual operation of shaft 55. It is likewise within the scope of my invention to provide two separate sources of power for moving the elevator and the tray. However, I prefer to provide some common drive means, such as shaft 55 and gear 54 which are movable to alternate driving positions, since in this way a single power source may be utilized to drive both the elevator moving mechanism and the tray moving mechanism. This is entirely practical since the trays are being moved onto and off the elevator only when the latter is at rest, so that power need be delivered to only one of the two driving mechanisms at any given time.

It is very desirable, but by no means essential, that there be provided registration means for insuring proper registration of the elevator with the tray to be selected, and also for indicating the setting of such registration means. I provide such a registration means within the vertically elongated housing 80, the details of the registration means being shown in Figs. 13, 14 and 15.

Within housing 80, is endless chain 82 which runs over upper and lower sprockets 83 and 84 respectively. Chain 82 carries a special link 82a having a roller 85 adapted to engage in succession the heads of a series of pins 86 slidably mounted in the side wall of housing 80. Each pin 86 is normally retracted by a spring 86a or similar means, but when engaged by roller 85 the pin is advanced horizontally to the right, as viewed in Fig. 13, until the end of the pin projects beyond the wall of housing 80. The heads of pins 86 have flat parallel vertical sides which are engaged between a pair of spaced, vertically extending guides 87, as shown in Fig. 15, to keep pins 86 from turning. Reaction to the thrust of roller 85 against pins 86 is taken by rollers 82b on link 82a pressing against web 88, a part of housing 80.

Figures 13, 14:
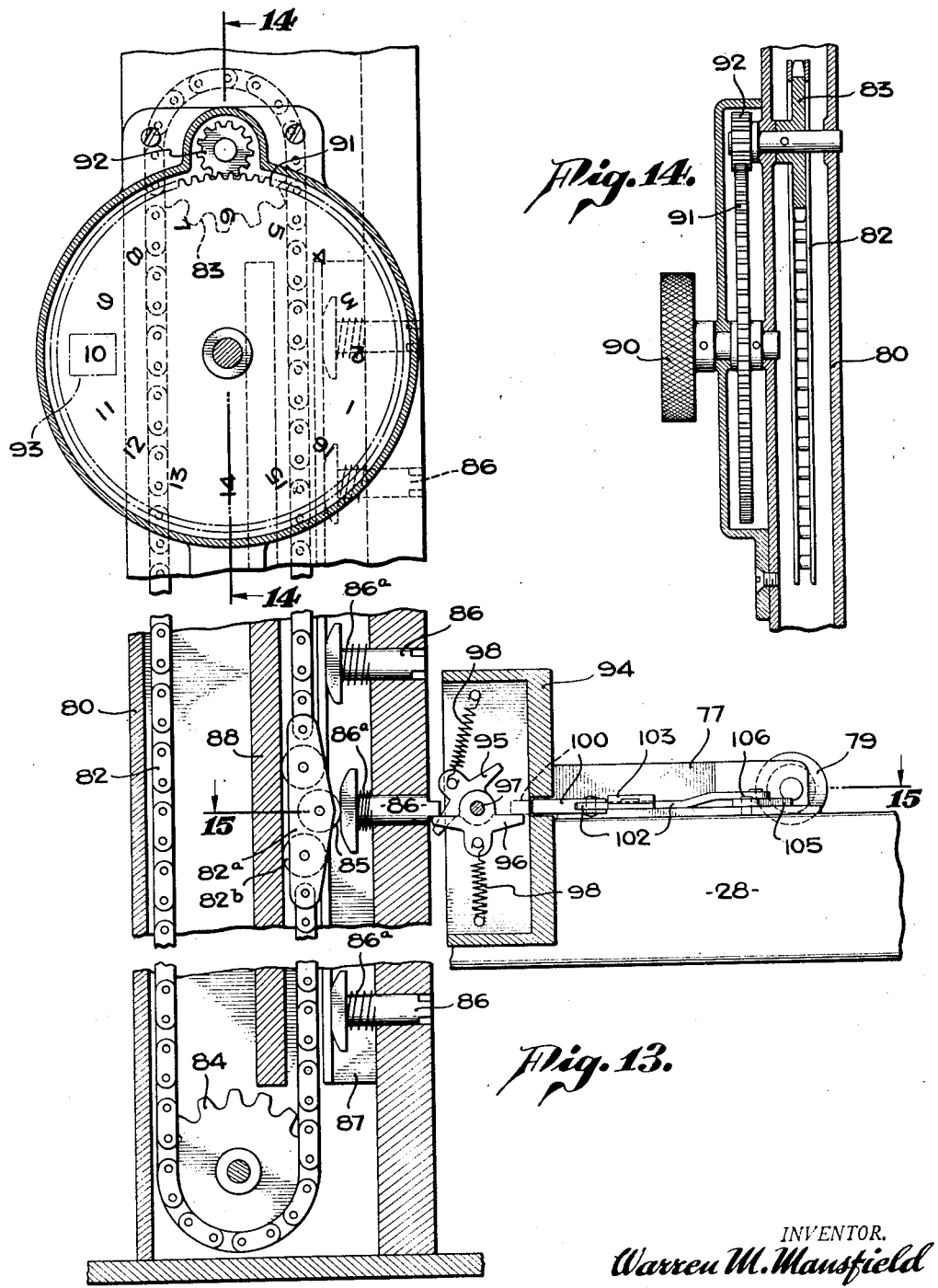
Fig. 13 is an enlarged fragmentary view, partly in elevation and partly in vertical section, showing the elevator registration means.
Fig. 14 is a fragmentary vertical section on line 14—14 of Fig. 13.

Movement of chain 82 is produced by manually turning knob 90 which is attached to the shaft carrying gear 91. Gear 91 meshes with a smaller gear 92 secured to the shaft carrying upper sprocket 83. Consequently, rotation of knob 90 turns sprocket 83 and moves chain 82 to raise or lower roller 85 depending upon the direction in which knob 90 is turned. The position of roller 85 and the pin 86 engaged thereby are indicated by numerals on the face of gear 91, as shown in Fig. 13. The number of pins 86 is equal to the number of trays 12, the pins being arranged in a vertical row with the spacing between pins equal to the spacing between trays. If, for example, cabinet 10 contains sixteen trays which are assigned the numbers 1 to 16 consecutively from the bottom upward, the same numbers are assigned to corresponding pins 86. Then the numeral 10, for example, on the dial face of gear 91 appears at window 93, the operator knowns that roller 85 has advanced the pin 86 corresponding to tray number 10. This is the position in which the parts are shown in the drawings.

In housing 94 on the side of elevator 27 (fastened to tubing 28) in a position adjacent the row of pins 86, there are two dogs 95 and 96 pivotally mounted on the elevator by means of pin 97. Dogs 95 and 96 are engageable with any pin 86 in the advanced position described above in order to limit the upward or downward travel of the elevator and stop it in registration with the tray corresponding to the pin advanced. Both dogs are biased by springs 98 toward a normal or neutral position in which the side wings of the dogs extend horizontally, as shown for dog 96 in Fig. 13. When in this position, each dog presents a horizontal surface that is engageable with a stop, which is fixed stop 99 in the case of dog 96 and horizontally movable stop 100 in the case of dog 95. Stop 100 slides in the wall of housing 94 and is attached to one end of slide 102 which is secured to tubing 28 by bracket 103.

The other end of slide 102 is attached to swinging latch plate 105 pivotally attached to tubing 28 at 106. The latch plate is engaged by stud 107 on frame 77 to be swung through the arc indicated at 108 between two alternate positions by movement of the tray moving means across the elevator. In the position of the parts shown in Figs. 13 and 15, latch plate 105 is swung to the right and stop 100 is fully retracted. When swung to the left, as in Fig. 3, slide 102 advances stop 100 to the position shown by the dotted lines in Figs. 13 and 15 in which dog 95 engages the stop.

Dog 96 positions elevator 27 when it is moving upwardly, as the dog cannot rotate counterclockwise beyond the position of Fig. 13; but if the elevator is moving downwardly, engagement of the dog with a pin 86 merely rotates the dog clockwise. Dog 95 operates in a similar manner to position elevator 27 when moving down and stop 100 is advanced to the left. When the elevator moves up, engagement with a pin 86 rotates dog 95 counter-clockwise, against spring 98, as shown in Fig. 13. In order to release the elevator to permit lowering it to display position, stop 100 is made retractable so that dog 95 can then be rotated clockwise to pass an advanced pin 86.

Having described the construction of my improved rug display machine, I shall now briefly describe its operation. Assume an initial condition in which all the trays are each carrying a rug and are arranged in a vertical stack in storage cabinet 10. One side of the stack is open, as shown in Fig. 1, in order that trays may be withdrawn therefrom. It is decided to display the rug carried on the tenth tray counting upwardly from the bottom. The first step then is to rotate gear 91 by turning knob 90 until the numeral 10 appears in window 93. Pin 86 corresponding to the desired tray has now been advanced horizontally and projects beyond the wall of housing 80, as shown in Fig. 13.

Next, handle 56 is pulled outwardly in order to move drive shaft 55 to the right, as viewed in Fig. 11, to engage drive gear 54 and ring gear 53. Then by rotating shaft 55 by turning crank 56, elevator 27 is raised or lowered, as required, until dog 96 or 95 as the case may be engages the advanced pin 86 and stops the elevator in the position to receive the tray selected.

During this vertical movement of the elevator, tray engaging members 77 have been at the end of the elevator adjacent the stack of trays. Thus, vertical movement of the elevator has brought the hooks 77b of the tray engaging members into a position in which each one engages a bracket 22 on the front edge of the selected tray. In this position, horizontal movement of tray moving means 77 withdraws the tray from the stack and moves it outwardly onto elevator 27. This motion of the tray engaging and moving means is brought about by pushing inwardly on crank 56 to move shaft 55 to the left, as viewed in Fig. 11 to bring gear 54 into engagement with ring gear 58. Subsequent rotation of shaft 55 by means of handle 56 causes movement of both endless chains 73 to move members 77 toward the right, as in Fig. 3, and draw the selected tray onto the elevator.

When in registration with the selected tray, the elevator is in the position indicated by the dot-dash lines in Fig. 2. Prior to withdrawal of the tray from the stack, the parts occupy the positions shown in Fig. 3. Initial movement of the tray out of the stack onto the elevator is shown in Fig. 1, while the tray fully withdrawn and supported on the elevator is shown by dot-dash lines in Fig. 2. It will be understood from the above that, when in proper registration, the sides of the elevator form, in effect, prolongations of angles 14 in storage cabinet 10, so that rollers 15 on the trays roll onto and along the elevator frame in the same manner as they roll over guides 14. As the tray is moved onto the elevator, stud 107 on frame 77 engages latch plate 105 and swings it to the right to the position occupied in Fig. 15, moving slide 102 in the same direction and retracting stop 100.

Now crank 56 is again pulled outwardly in order again to engage gears 54 and 53. Subsequent rotation of crank 56 lowers elevator 27 to the full-line position of Fig. 2 to place the selected tray upon display platform 25. Retraction of stop 100 permits dog 95 to turn freely about pin 97 and pass pin 86 as the tray and elevator are lowered to the platform.

As may be seen best by reference to Figs. 1 and 4, display platform 25 is smaller in its overall dimensions than elevator 27, so that the elevator can be moved downwardly to a level beneath the top of the display platform. It will also be noted that the platform itself is recessed around its edges, as at 25a, and in the central portion, at 25b, in order to receive the frame members 12a and 12b respectively of a tray 12. This makes the top surface of the platform of a size to fit within the rectangular elevator frame, and subdivides it in such a manner that it, in effect, passes through the tray to a position substantially level with the top surface of the tray on the elevator. Consequently, when the tray is placed upon the platform, the rug thereon rests directly upon and is supported substantially entirely by the top surface of the platform.

It is considered advantageous that the elevator move downwardly a very short distance beyond the position in which the tray engages the platform. This overtravel causes rollers 15 to disengage the elevator and insures that the tray and rug rest only on the platform, in spite of small changes in dimensions.

The rug on the platform is now presented to the prospective purchaser in its normal position, that is, the rug is lying horizontal on or near the floor. Since the rug rests directly upon the platform and is supported by the platform independently of the tray frame, the prospective purchaser may walk upon the rug, his weight being carried by the platform and not by the tray frame. The top of the display platform is preferably covered with a pad 110 (shown in Figs. 4 and 8 only) of a type conventionally used underneath rugs when on the floor, or if preferred, this pad may be placed upon the tray underneath the rug. The former method of using the rug pad is preferred since it is more economical of pads and lightens the load carried by the tray. In this instance, metal straps 17 rest upon the pad and when a person walks upon the rug on the platform, the presence of the thin, flat straps is not noticed since they have a relatively small vertical dimension and the resiliency of the pad and of the rug is such that the straps become imbedded in them without causing any appreciable unevenness in the surface of the rug. It will be seen that the advantage of the reticulate rug support which I have disclosed is that it permits the rug to rest upon the display platform and yet, when walked upon, there is not transmitted to the tray frame any of the load of the individual walking on the rug.

It will be evident, without further recitation, how the above operations of placing the rug upon the display platform can be reversed in sequence in order to cause the elevator to raise the tray and rug to the proper level and to move the tray off the elevator back into the vertical stack of trays within cabinet 10.

Although I have illustrated a form of rug display apparatus in which the stack of trays is open at only one side, it is within the scope of my invention to provide a stack open at two opposite sides, in which case the display platform, the elevator, and the elevator operating assembly as shown are duplicated on the other open side of cabinet 10. This arrangement permits twice as much use to be made of the rugs stored within the cabinet, and also has the further advantage of permitting simultaneous display, for comparison purposes, of two selected rugs. Since the additional equipment would be the same as shown, it is considered unnecessary to illustrate it in the drawings.

Having described a preferred embodiment of my invention, it will be evident that changes in the details of construction and arrangements of parts may be made by persons skilled in the art without departing from the spirit and scope of my invention; and therefore I wish it understood that the foregoing description is to be construed as illustrative of, rather than limitative upon, the appended claims.

I claim:

1. In a rug display apparatus, the combination comprising: a plurality of rug-carrying trays arranged in a vertically extending stack and adapted to horizontal movement into and out of the stack; an elevator movable vertically to the level of any selected tray in the stack; tray moving means carried by the elevator and engageable with a selected tray by vertical movement of the elevator for moving the tray horizontally out of the stack and onto the elevator and return; means to raise and lower the elevator with a rug-carrying tray thereon; and common driving means for the tray handling means and the elevator adapted to operate either the tray moving means or the elevator as selected, said common driving means comprising a drive shaft and a gear driven thereby which is movable between two driving positions in one of which the gear drives the tray moving means and in the other of which the gear drives the elevator.

2. In a rug display apparatus, the combination comprising: a plurality of rug-carrying trays arranged in a vertically extending stack and adapted to horizontal movement into and out of the stack; an elevator movable vertically to the level of any selected tray in the stack; tray moving means carried by the elevator and including a member engageable with a selected tray while in the stack for moving the tray horizontally out of the stack and onto the elevator and return; means to raise and lower the elevator with a rug-carrying tray thereon; and registration means for stopping the elevator at the proper level to receive or discharge the selected tray and to engage said member of the tray moving means with the selected tray in the stack.

3. In a rug display apparatus, the combination comprising: a plurality of rug-carrying trays arranged in a vertically extending stack and adapted to horizontal movement into and out of the stack; an elevator movable vertically to the level of any selected tray; tray moving means carried by the elevator and engageable with a selected tray for moving the tray horizontally onto and off of the elevator; means to raise and lower the elevator with a rug-carrying tray thereon; and registration means for positioning the elevator at the proper level to receive or discharge the selected tray; said registration means comprising a plurality of pins equal in number to the number of trays and arranged in a vertical row, means for advancing horizontally a selected pin, and two spring biased dogs carried on the elevator and engageable with said pins when advanced, one dog being adapted to limit downward movement of the elevator only and the other dog to limit upward movement only to stop the elevator in registration with a selected tray.

4. In a rug display apparatus, the combination comprising: a plurality of rug-carrying trays arranged in a vertically extending stack and adapted to horizontal movement into and out of the stack; an elevator movable vertically to the level of any selected tray in the stack, the elevator being formed as an open rectangular member; tray moving means carried by the elevator and engageable with a selected tray for moving the tray horizontally onto and off of the elevator; means to raise and lower the elevator with a rug-carrying tray thereon; and a rug display platform beneath the elevator upon which the elevator can place the selected tray.

5. In a rug display apparatus, the combination comprising: a plurality of rug-carrying trays arranged in a vertically extending stack and adapted to horizontal movement into and out of the stack, each tray comprising a rectangular frame surrounding a central section on which the rug rests; an elevator movable vertically to the level of any selected tray in the stack; tray moving means carried by the elevator and engageable with a selected tray for moving the tray horizontally onto and off of the elevator; means to raise and lower the elevator with a rug-carrying tray thereon; and a rug display platform beneath the elevator upon which the elevator can place the selected tray with the rug supported directly by the platform.

6. In a rug display apparatus the combination comprising: a plurality of rug-carrying trays arranged in a vertically extending stack and adapted to horizontal movement into and out of the stack, each tray comprising an open rectangular frame and a central reticulate section; an elevator movable vertically to the level of any selected tray in the stack, the elevator being formed as an open rectangular member; tray moving means carried by the elevator and engageable with a selected tray by vertical movement of the elevator for moving the tray horizontally onto and off of the elevator; means to raise and lower the elevator with a rug-carrying tray thereon; and a rug display platform beneath the elevator upon which the elevator can place the selected tray with the rug supported by the platform independently of the tray frame.

7. In a rug display apparatus, the combination comprising: a plurality of rug-carrying trays arranged in a vertically extending stack and adapted to be moved horizontally to be inserted into or withdrawn from the stack, each of said trays comprising a rectangular frame and central reticulate section; and a rug display platform adjacent one side of the stack of trays and adapted to receive and support a rug-carrying tray with the rug resting upon the platform and supported thereby independently of the tray frame.

8. In a rug display apparatus, the combination comprising: a plurality of rug-carrying trays arranged in a vertically extending stack and adapted to be moved horizontally to be inserted into or withdrawn from the stack, each of said trays comprising a rectangular frame surrounding a central reticulate section, upon which the rug rests; and a rug display platform adjacent one side of the stack of trays and adapted to receive and support a rug-carrying tray with the rug resting upon the platform and supported thereby independently of the tray frame; and means to withdraw a selected tray from the stack and place it on the display platform.

9. In a rug display device of the character described having a plurality of rug-carrying trays arranged in a vertical stack and removable therefrom at one side of the stack, and a rug display platform adjacent said one side of the stack, tray handling means for withdrawing a selected tray from the stack and placing it on the platform, comprising: an upright column at one side of the platform; a open rectangular elevator frame; an arm supporting the elevator on said column for upward and downward movement of the elevator above the display platform; operating means carried on the column to raise and lower said arm; a pair of tray engaging members mounted on the elevator, one at each of opposite sides thereof; and means to simultaneously move said tray engaging members horizontally on the elevator to withdraw a tray from the stack and place it on the elevator.

10. In a rug display apparatus, the combination comprising: a plurality of rug-carrying trays arranged in a vertically extending stack and adapted to horizontal movement into and out of the stack; a projecting bracket on each tray spaced from the body of the tray, said brackets on the several trays being vertically aligned; an elevator movable vertically to the level of any selected tray in the stack; tray moving means carried on the elevator and including a hook shaped member horizontally movable over the elevator to a position in which the hook shaped member passes vertically between the trays and the associated projecting brackets when the elevator moves vertically, said hook shaped member being engageable with the bracket of a selected tray in the stack for moving the tray out of the stack and onto the elevator; and means to raise and lower the elevator with a rug carrying tray thereon.

11. In a rug display apparatus, the combination comprising: a rug-carrying tray for storing a rug in a horizontal position, said tray comprising an open rectangular frame of structural shapes, a plurality of other structural shapes extending across said frame between two opposite sides thereof in relatively widely spaced positions, and a plurality of relatively thin flat widely spaced members extending across the frame between the other two opposite sides thereof; a display platform adjacent the storage position of said rug-carrying tray but laterally removed therefrom, said rug display platform being recessed to receive the structural shapes of the rug-carrying tray; and means to move the tray from the storage position and deposit it on the display platform with the rug supported thereby independently of the structural members of the tray.

WARREN M. MANSFIELD.

REFERENCES CITED

The following references are of record in the file of this patent:

UNITED STATES PATENTS

| Number | Name | Date |
|---|---|---|
| 371,785 | Plummer | Oct. 18, 1887 |
| 1,008,245 | De Lisle et al. | Nov. 7, 1911 |
| 2,333,097 | Duboc | Nov. 2, 1943 |